United States Patent
Peng et al.

(10) Patent No.: US 8,305,490 B2
(45) Date of Patent: Nov. 6, 2012

(54) DE-INTERLACING SYSTEM

(75) Inventors: Yuan-Chih Peng, Jhubei (TW); Yen-Lin Chen, Sindian (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 400 days.

(21) Appl. No.: 12/654,015

(22) Filed: Dec. 8, 2009

(65) Prior Publication Data

US 2010/0283897 A1 Nov. 11, 2010

(30) Foreign Application Priority Data

May 7, 2009 (TW) .............................. 98115105 A

(51) Int. Cl.
*H04N 7/01* (2006.01)
(52) U.S. Cl. ..................................................... 348/452
(58) Field of Classification Search .................. 348/452, 348/451, 441, 448, 458, 459, 449
See application file for complete search history.

(56) References Cited

U.S. PATENT DOCUMENTS

| 6,034,733 | A  | * | 3/2000  | Balram et al. | 348/448 |
| 6,317,165 | B1 | * | 11/2001 | Balram et al. | 348/699 |
| 7,170,562 | B2 | * | 1/2007  | Yoo et al.    | 348/452 |
| 2003/0112369 | A1 | * | 6/2003 | Yoo et al.    | 348/448 |

FOREIGN PATENT DOCUMENTS

| CN | 1500347 A | 5/2004 |
| CN | 1536876 A | 10/2004 |
| CN | 1622614 A | 6/2005 |

* cited by examiner

*Primary Examiner* — Paulos Natnael
(74) *Attorney, Agent, or Firm* — Bacon & Thomas, PLLC

(57) ABSTRACT

A de-interlacing system includes a motion adaptive de-interlacer, a horizontal motion estimation device, a horizontal motion compensation device, a vertical motion detection device, a multiplexer, and a film signal detector. The film signal detector receives an input signal and decides whether the input signal is a video stream or a film stream to thereby select an output from the motion adaptive de-interlacer or the horizontal motion estimation and compensation device. Thus, a de-interlacing output has stable and smooth edges when a video stream is inputted, and the motion judder phenomenon is reduced when a film stream is inputted.

6 Claims, 6 Drawing Sheets

DE-INTERLACING SYSTEM

BACKGROUND OF THE INVENTION

1. Field of the Invention

The present invention relates to the technical field of image processing and, more particularly, to a de-interlacing system.

2. Description of Related Art

Conventional television (TV) signals are usually interlaced scan signals due to the limit of display technique. By scanning odd and even rows at different time, the still frame resolution and the motion continuity can be concurrently held at a limited horizontal scan rate. However, when the original content of a video signal is of a film signal, a progressive scan frame is typically divided into two interlaced scan fields, which is referred to as a 2:2 pull down, since a film is obtained by a progressive scan shoot. If a TV signal has different field and frame rates, a different field repetition such as a 3:2 pull down is used in conversion.

Due to the advance of display technology, the screen for current televisions or computers mostly uses a progressive scan manner. Accordingly, a de-interlacing is used to convert the signal from an interlaced scan to a progressive scan. For a non-film signal such as a video signal, the de-interlacing typically makes use of a motion adaptive de-interlacing (MADI) or a motion compensated de-interlacing (also known as motion estimation and motion compensation, MEMC) to produce the progressive scan signal. The MADI technique includes a motion detection to use a spatial interpolation to thereby produce un-transmitted fields for the motion image parts and produce the final progressive scan signal by directly combining the different field signals at tandem time for the still image parts. The MEMC technique uses a motion estimation to find a motion vector and performs a motion compensation according to the field time to thereby produce the un-transmitted field signals.

The de-interlacing for a film signal includes an inverse pull down and a motion compensation. The inverse pull down detects field signals corresponding to the same frame and combines them into the frame. The motion compensation uses a motion estimation and compensation and increases the frame rate.

Current de-interlacers are typically classified into those applying the MADI technique to a non-film signal and the pull down to a film signal, and those applying the MEMC technique to the non-film and film signals.

However, there are some disadvantages on the two de-interlacing techniques. The MADI technique can gain a steady representation for a non-film signal by enhancing a spatial slant low angle interpolation to smooth the motion edges, but for a film signal, the motion judder produced at a lower frame rate cannot be overcome even the inverse pull down can restore an original progressive scan image. The MEMC technique can use the motion compensation to interpolate a frame at a middle time point to thereby reduce the motion judder in a film signal, and increase the vertical resolution of a motion object in a non-film signal. However, the technique can easily present fine horizontal lines in the non-film signal due to the odd and even field differences after the compensation.

Therefore, it is desirable to provide an improved de-interlacing system to mitigate and/or obviate the aforementioned problems.

SUMMARY OF THE INVENTION

The object of the present invention is to provide a de-interlacing system, which can overcome the fine horizontal lines due to the odd and even field differences after the compensation and also reduce the motion judder in the prior art.

To achieve the object, a de-interlacing system is provided, which includes a first field buffer, a second field buffer, a line buffer, a motion adaptive de-interlacer (MADI), a film frame generator, a film signal detector and a multiplexer. The first field buffer has an input terminal in order to receive fields successively entered and temporarily store an entered field as a next field, while a field to be entered is a next-two field. The second field buffer is connected to the first field buffer in order to receive the next field in the first field buffer and temporarily store the next field as a current field. The line buffer is connected to the input terminal, the first field buffer and the second field buffer in order to temporarily store partial line data of the next-two filed, the next field and the current field. The motion adaptive de-interlacer is connected to the line buffer in order to produce a de-interlaced video frame according to the partial line data. The film frame generator is connected to the line buffer in order to produce a de-interlaced film frame according to the partial line data. The film signal detector is connected to the input terminal, the first field buffer and the second field buffer in order to decide whether a stream corresponding to the next-two field is a video stream or a film stream based on the next-two field, the next field and the current field, and accordingly output a mode index. The multiplexer is connected to the MADI, the film frame generator and the film signal detector in order to select the de-interlaced video frame or film frame as an output based on the mode index.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
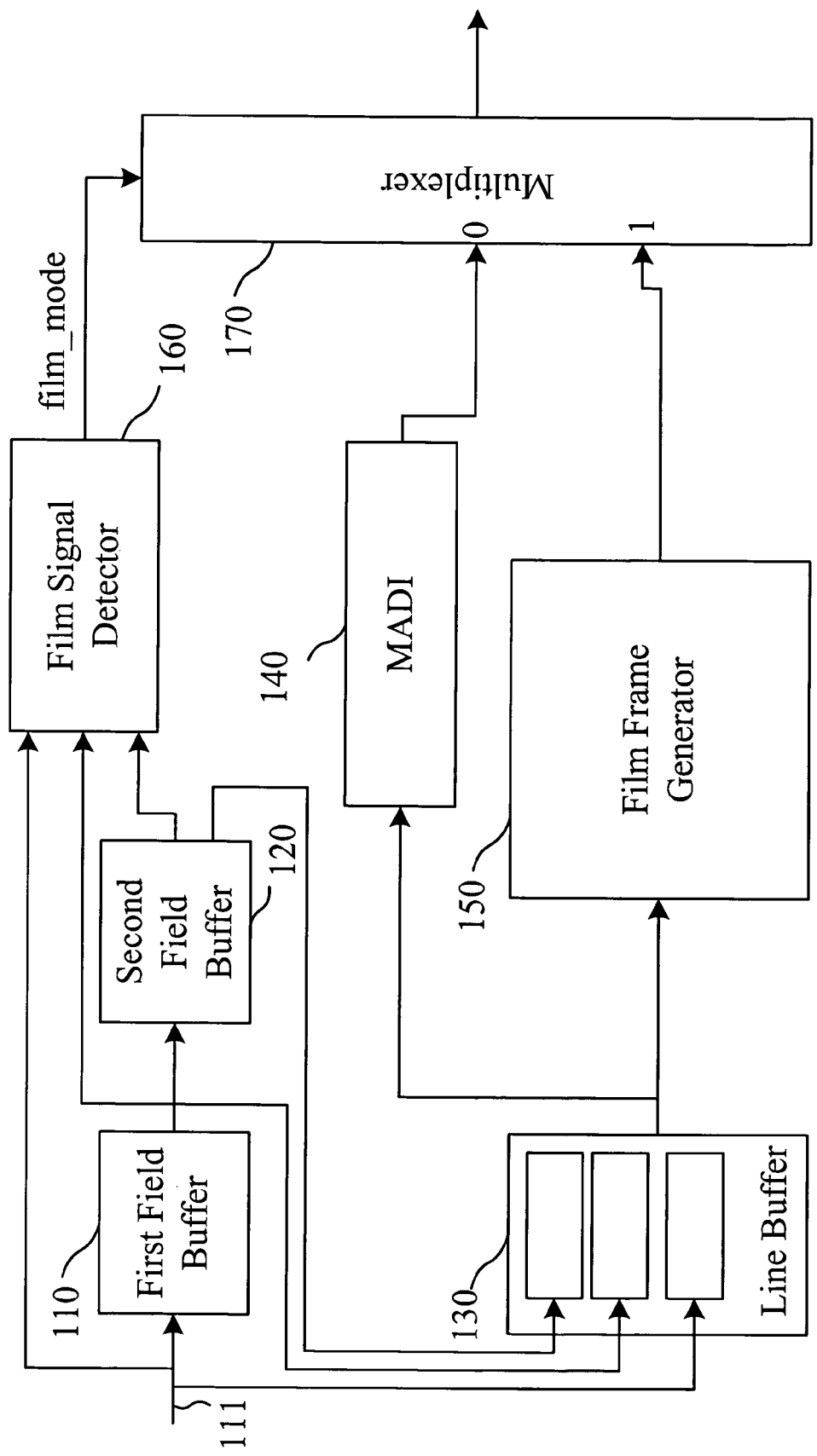
FIG. 1 is a block diagram of a de-interlacing system according to an embodiment of the invention.

FIG. 1 is a block diagram of a de-interlacing system 100 in accordance with an embodiment of the invention. In FIG. 1, the de-interlacing system 100 includes a first field buffer 110, a second field buffer 120, a line buffer 130, a motion adaptive de-interlacer (MADI) 140, a film frame generator 150, a film signal detector 160 and a multiplexer 170.

The first field buffer 110 has an input terminal 111 to receive a field successively in time axis. That is, a series of fields enters the first field buffer 110 via the input terminal 111 as time passes, and the first field buffer 110 temporarily stores the entered field as a next field for output, while the field to be entered into the first field buffer 110 is a next-two field.

The second field buffer 120 is connected to the first field buffer 110 in order to receive the next field in the first field buffer 110 and temporarily store the next field as a current field for output.

The line buffer 130 is connected to the input terminal 111, the first field buffer 110 and the second field buffer 120 in order to temporarily store partial line data of the next-two filed, the next field and the current field. The line buffer 130 is preferably a three-line buffer to store the partial line data of the next-two filed, the next field and the current field respectively.

The motion adaptive de-interlacer (MADI) 140 is connected to the line buffer 130 in order to produce a de-interlaced video frame according to the partial line data temporarily stored in the line buffer 130. The motion adaptive de-interlacer 140 uses a motion detection to perform a spatial interpolation on the motion image parts to thereby produce un-transmitted signals, but directly combines the fields at tandem time on the still image parts into a final progressive scan video frame.

The film frame generator 150 is connected to the line buffer 130 in order to produce a de-interlaced film frame according to the partial line data by a known film signal de-interlacing technique such as an inverse pull down, a motion compensation and so on.

The film signal detector 160 is connected to the input terminal 111, the first field buffer 110 and the second field buffer 120 in order to decide whether a stream corresponding to the next-two field is a video stream or a film stream based on the next-two field, the next field and the current field, and accordingly output a mode index film_mode. When the mode index film_mode is at a low voltage (0), it indicates that the stream is a video stream. Conversely, when the mode index film_mode is at a high voltage (1), it indicates that the stream is a film stream.

The multiplexer 170 is connected to the MADI 140, the film frame generator 150 and the film signal detector 160 in order to select the de-interlaced video frame or film frame as an output based on the mode index film_mode. Accordingly, it is clear that the de-interlacing system 100 concurrently includes the MADI technique and the film signal de-interlacing technique to accordingly select a video or film signal as a signal source to be interlaced and output the result.

Figure 2:
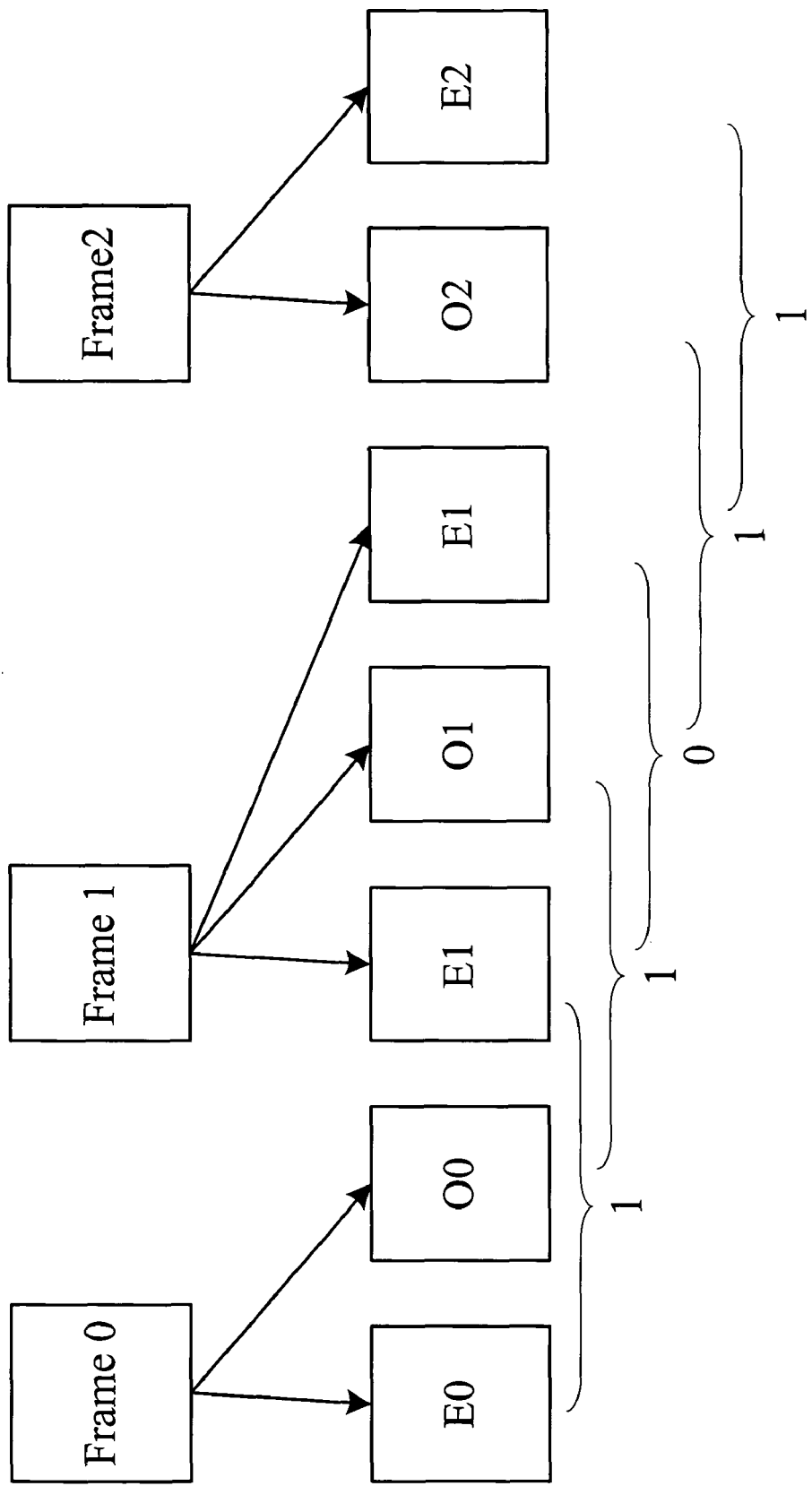
FIG. 2 is a schematic diagram of an operation of a film signal detector according to an embodiment of the invention.

FIG. 2 schematically illustrates the operation of the film signal detector 160 in accordance with an embodiment of the invention, which is given in an exemplary 3:2 pull down. As shown in FIG. 2, when the stream is a film stream and the 3:2 pull down is performed completely, Frame 0 is divided into an even field E0 and an odd field O0, Frame 1 is divided into a first even field E1, an odd field O1 and a second even field E1, and Frame 2 is divided into an odd field O2 and an even field E2. The film signal detector 160 compares a field and two fields following the field, i.e., comparing the even field E0 and the first field E1, the odd fields O0 and O1, the first and second even fields E1 and E1, the odd fields O1 and O2, the second even field E1 and the even field E2, and the like. When the likelihood of the compared fields exceeds a threshold, a mark "0" is added, and otherwise "1" is marked. As shown in FIG. 2, when the stream is the film stream, the comparison result presents "1101111011110 . . . ", which shows "0" once every five comparisons. Namely, the result that the likelihood exceeds the threshold presents once every five comparisons. Accordingly, it can be used to decide whether the stream is the film stream or not.

Figure 3:
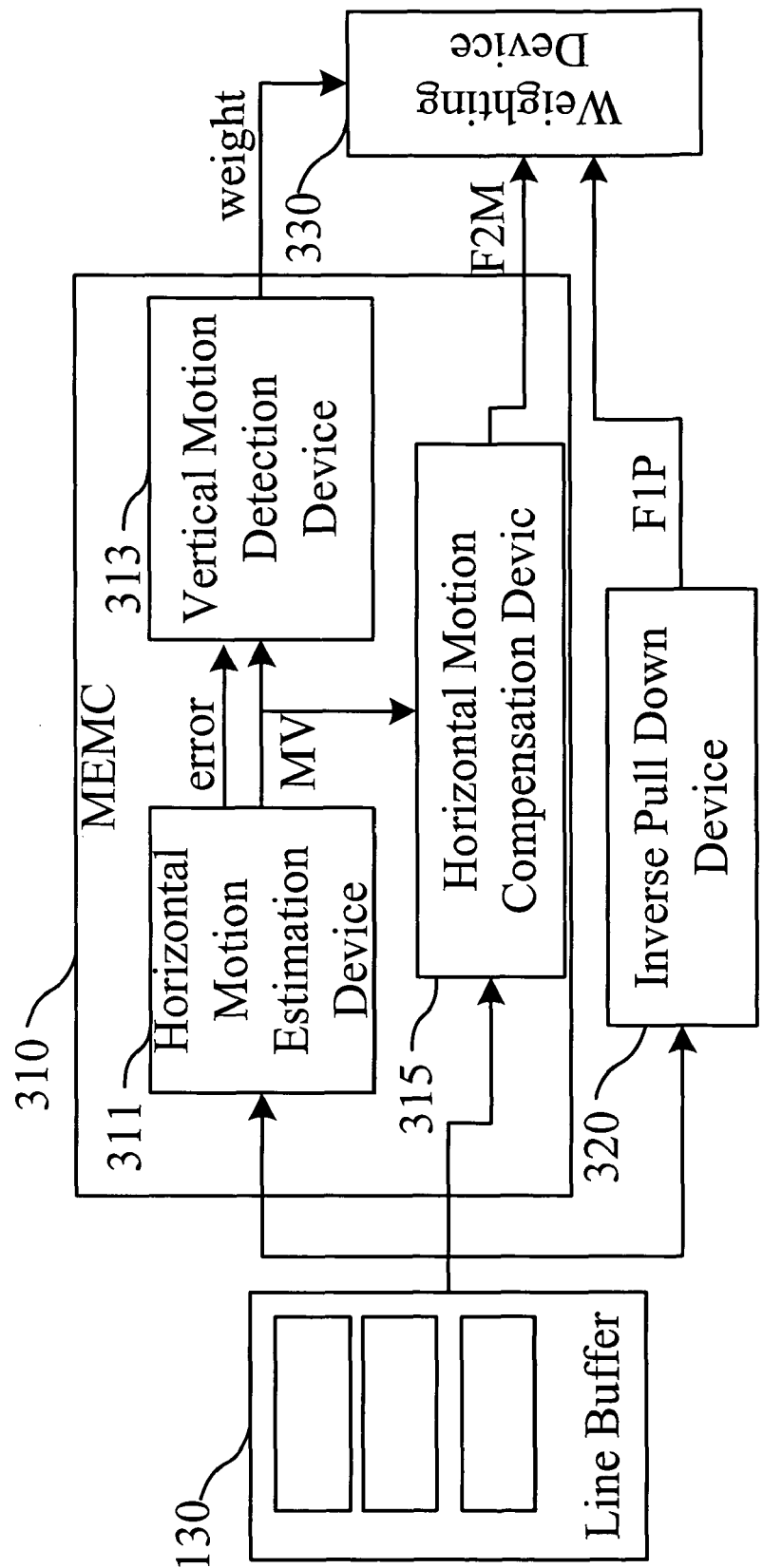
FIG. 3 is a block diagram of a film frame generator according to an embodiment of the invention.

FIG. 3 is a block diagram of the film frame generator 150 in accordance with an embodiment of the invention. In FIG. 3, the film frame generator 150 includes a motion compensated de-interlacer (MEMC) 310, an inverse pull down device 320 and a weighting device 330.

The MEMC 310 is connected to the line buffer 130 in order to produce a weighting signal "weight" and a motion compensated de-interlacing frame F2M based on the partial line data temporarily stored in the line buffer 130.

The inverse pull down device 320 is connected to the line buffer 130 in order to produce an inverse pull down de-interlacing frame F1P based on the partial line data.

The weighting device 330 is connected to the MEMC 310 and the inverse pull down device 320 in order to perform a weighting operation on the motion compensated de-interlacing frame F2M and the inverse pull down de-interlacing frame F1P to thereby produce the de-interlaced film frame, which can be expressed as:

$$weight \times F2M + (1-weight) \times F1P,$$

where "weight" indicates the weighting signal, F2M indicates the motion compensated de-interlacing frame, and F1P indicates the inverse pull down de-interlacing frame.

As shown in FIG. 3, the MEMC 310 includes a horizontal motion estimation device 311, a horizontal motion compensation device 315 and a vertical motion detection device 313.

The horizontal motion estimation device 311 is connected to the line buffer 130 in order to produce a motion vector signal MV and a matching error signal "ERROR" according to the partial line data.

The horizontal motion compensation device 315 is connected to the line buffer 130 in order to produce the motion compensated de-interlacing frame F2M according to the partial line data and the motion vector signal MV.

The vertical motion detection device 313 is connected to the horizontal motion estimation device 311 in order to produce the weighting signal "weight" according to the motion vector signal MV and the matching error signal "ERROR".

Figure 4:
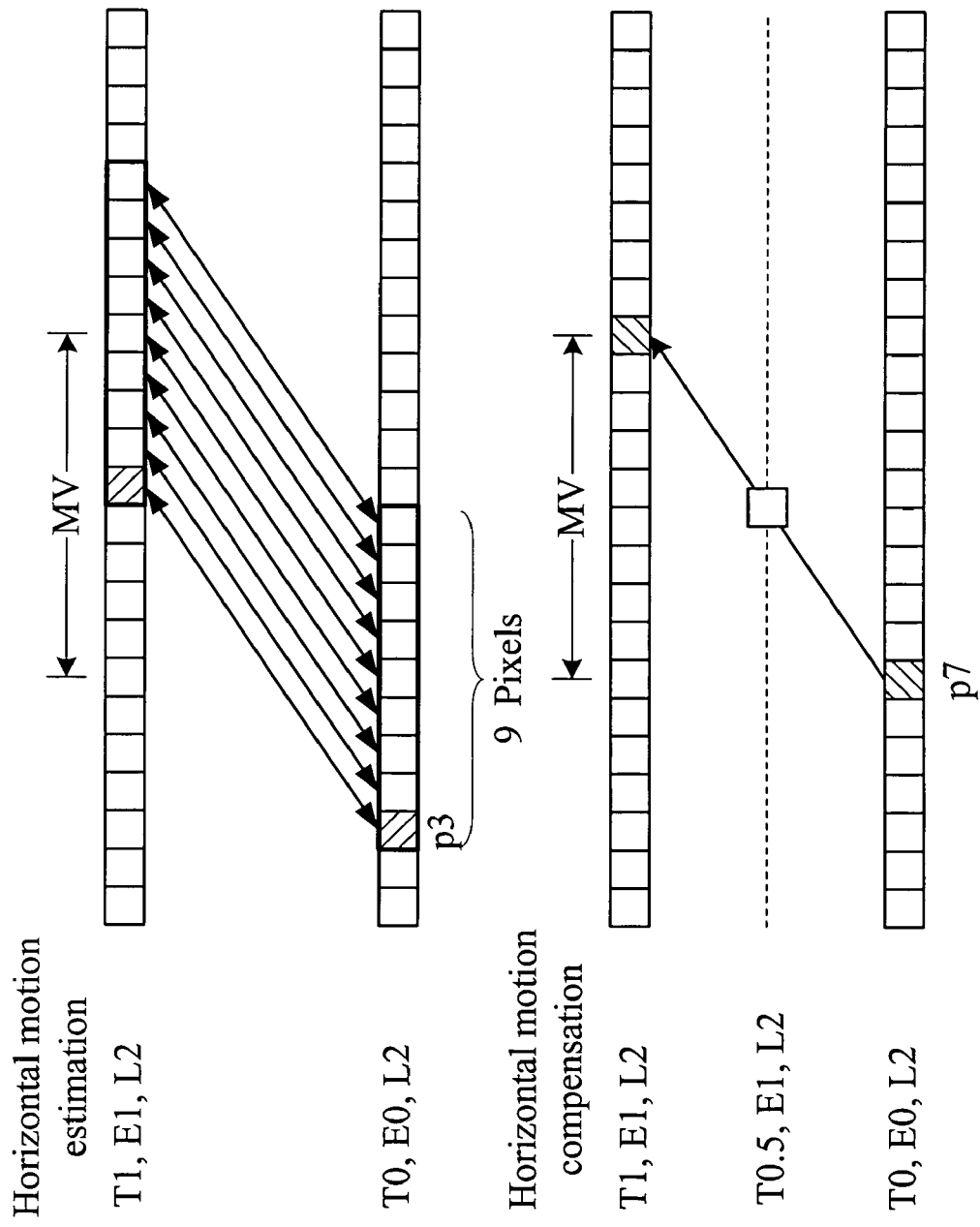
FIG. 4 schematically illustrates the operation of a horizontal motion estimation device and a horizontal motion compensation device according to an embodiment of the invention.

FIG. 4 schematically illustrates the operation of the horizontal motion estimation device 311 and the horizontal motion compensation device 315 in accordance with an embodiment of the invention. As shown in FIG. 4, the horizontal motion estimation device 311 finds that the sum of absolute differences (SAD) is minimum for the nine pixels of the line L2 respectively of the even field E0 at time T0 and the even field E1 at time T1, and accordingly the motion vector signal MV is obtained. In this case, the motion vector signal MV is a representation of moving nine pixels right.

The horizontal motion compensation device 315 performs an interpolation on the pixels of the line L2 respectively of the even field E0 at time T0 and the even field E1 at time T1 to thereby obtain the pixels of the line L2 of the even field E0 at time T0.5. Since the motion vector signal MV has nine pixels, it is estimated that the motion vector signal MV at time T0.5 has 4.5 pixels. The location of pixel P7 at time T0 counts seven pixels, and it is estimated that the location of pixel P7 at time T0.5 counts 11.5 (7+4.5) pixels. Accordingly, the horizontal motion compensation device 313 can obtain the pixels of the line L2 of the even field E0 at time T0.5 by interpolation.

The horizontal motion estimation device 311 can use the SAD or other methods to find the motion vector signal MV. However, other factors such as a vertical motion or hidden pixels may occur, and thus the obtained motion vector signal MV may not be correct. The horizontal motion estimation device 311 is based on the partial line data to produce the matching error signal ERROR to accordingly indicate whether the motion vector signal MV is correct or not for the vertical motion detection device 313.

Figure 5:
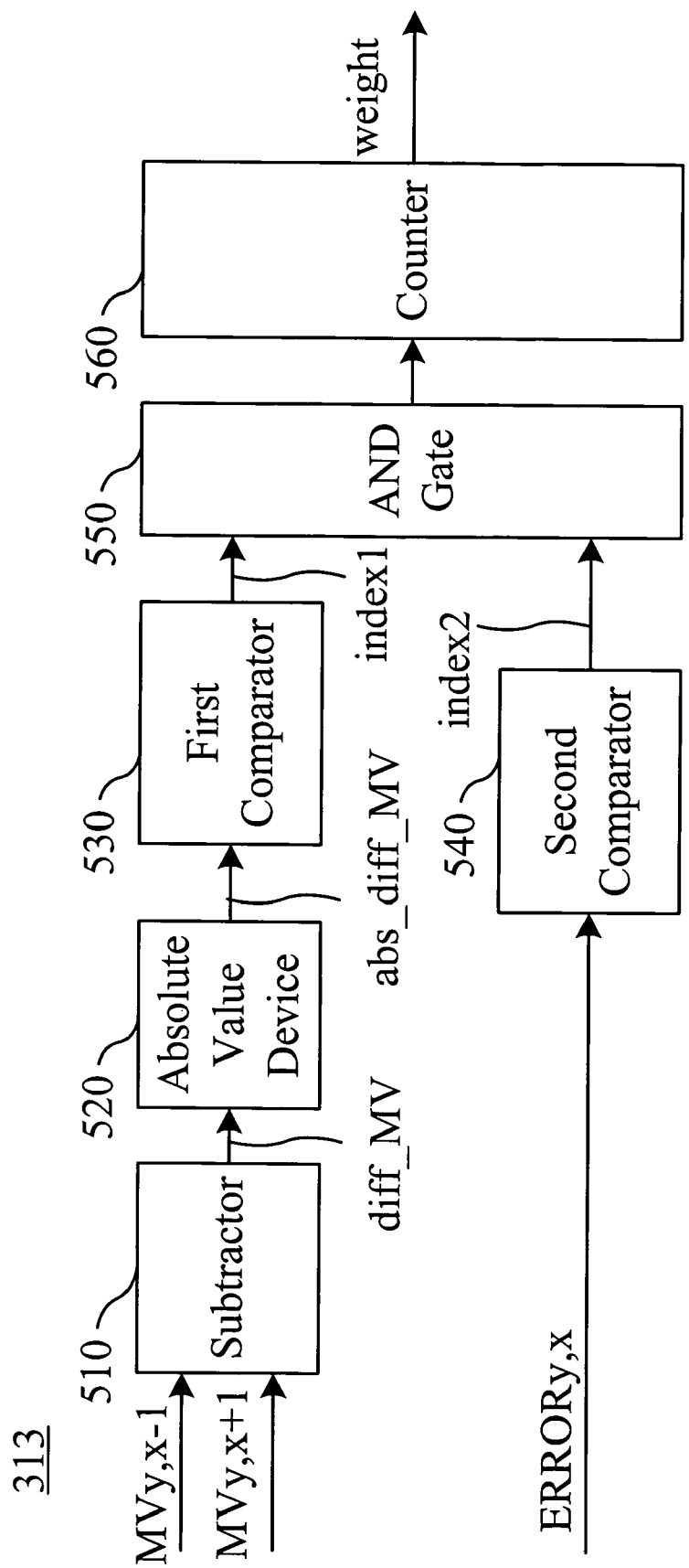
FIG. 5 is a block diagram of a vertical motion detection device according to an embodiment of the invention.

FIG. 5 is a block diagram of the vertical motion detection device 313 in accordance with an embodiment of the invention. In FIG. 5, the vertical motion detection device 313 includes a subtractor 510, an absolute value device 520, a first comparator 530, a second comparator 540, an AND gate 550 and a counter 560.

The subtractor 510 receives the motion vector signal MV to produce a motion vector difference signal diff_MV. For a pixel (x, y), the subtractor 510 uses the motion vector signal $MV_{y,x-1}$ of a left pixel (x−1, y) and the motion vector signal $MV_{y,x+1}$ of a right pixel (x+1, y) with respect to the pixel (x, y) to thereby produce the motion vector difference signal diff_MV.

The absolute value device 520 is connected to the subtractor 510 in order to perform an absolute operation on the motion vector difference signal diff_MV to thereby produce a motion vector absolute difference signal abs_diff_MV. The value of the signal abs_diff_MV indicates that a corresponding pixel point locates in a visible or hidden area.

The first comparator 530 is connected to the absolute value device 520 in order to produce a first comparison signal index 1 when the motion vector absolute difference signal abs_diff_MV is smaller than a first threshold Th1. The first comparison signal "index1" indicates that the pixel point does not locate in the visible or hidden area.

The second comparator 540 is connected to the horizontal motion estimation device 311 in order to produce a second comparison signal index2 when the matching error signal ERROR is greater than a second threshold Th2. For the pixel (x, y), the second comparator 540 compares the matching error signal $ERROR_{y,x}$ of the pixel (x, y) and the second threshold Th2.

The AND gate 550 is connected to the first comparator 530 and the second comparator 540 in order to perform an AND operation on the first comparison signal and the second comparison signal to thereby produce an index signal "index".

The counter 560 is connected to the AND gate 550 in order to count the index signal "index" to thereby produce a counting result and find the relation of the counting result and the weighting signal through a lookup table and further obtain the weighting signal "weight", wherein as the weighting signal "weight" is getting larger, the possibility of a vertical motion is getting smaller.

Figure 6:
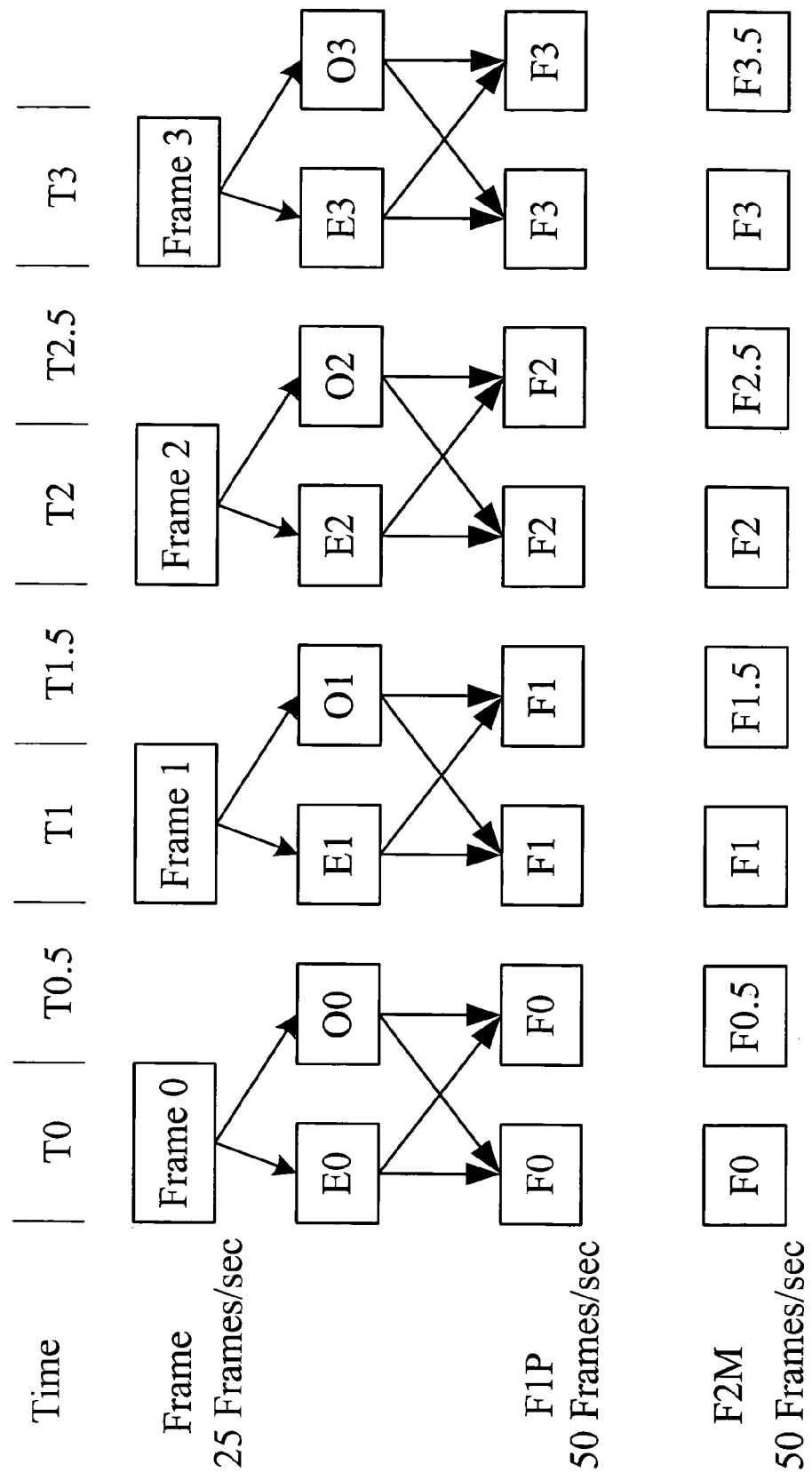
FIG. 6 schematically illustrates the operation of a motion compensated de-interlacer (MEMC) and an inverse pull down device according to an embodiment of the invention.

FIG. 6 schematically illustrates the operation of the motion compensated de-interlacer (MEMC) 310 and the inverse pull down device 320 in accordance with an embodiment of the invention. As shown in FIG. 6, when the stream is a film stream and a 2:2 pull down is performed completely, Frame 0 is divided into an even field E0 and an odd field O0, Frame 1 is divided into an even field E1 and an odd field O1, Frame 2 is divided into an odd field O2 and an even field E2, and Frame 3 is divided into an even field E3 and an odd field O3. The partial data of the even and odd fields is stored in the line buffer 130.

The inverse pull down device 320 performs a de-interlacing operation on the even fields and the odd fields to thereby produce the inverse pull down de-interlacing frame F1P. As shown in FIG. 6, the inverse pull down device 320 uses the even and odd fields E0 and O0 corresponding to Frame 0 to produce Frame F0 at time T0 and T0.5 respectively. Similarly, the other frames F1 to F3 at different time are obtained.

The motion compensated de-interlacer (MEMC) 310 performs a de-interlacing operation on the even fields and the odd fields respectively to thereby produce the motion compensated de-interlacing frame F2M. As shown in FIG. 6, the MEMC 310 uses the even and odd fields E0 and O0 corresponding to Frame 0 to produce Frame F0 at time T0 and Frame F0.5 at time T0.5 respectively. Similarly, the other frames F1 to F3.5 at different time are obtained.

It is observed in a filmmaking that in most motions, especially in an integrated motion caused by lens movements, the possibility of a horizontal movement is much greater than that of a vertical movement. Therefore, the film signal motion judder can be relatively reduced by performing a motion estimation and compensation on the horizontal motions. According to this feature, the invention provides a de-interlacing system, including an MADI 140, a film frame generator 150, a film signal detector 160 and shared memory (buffers 110, 120, 130). The film frame generator 150 has a horizontal motion estimation device 311, a horizontal motion compensation device 315 and a vertical motion detection device 313. The detection result outputted by the film signal detector 160 is used to select the device 140 or 150 as an output, such that a de-interlaced output can maintain steady and smooth edges when a non-film signal is inputted and reduce the motion judder when a film signal is inputted. In addition, the vertical motion detection device 313 is used to reduce the required motion compensation proportion to thereby avoid an MEMC error caused by a vertical motion.

The de-interlacing system of the invention concurrently includes the MADI technique and the film signal de-interlacing technique to accordingly select a video or film signal as a signal source. Thus, both a steady de-interlacing and an improved motion judder caused by a film signal low frame rate are obtained. In addition, since the MADI 140 is independent from the horizontal motion estimation device 311 and horizontal motion compensation device 315, and both of them have a similar image processing range, the multiplexer 170 can select an output signal to thereby decide that the operation of determining whether a signal is a film signal or not is processed by the MADI 140 and the MEMC 310 respectively. At a film mode, the horizontal motion estimation device 311 and the horizontal motion compensation device 315 can reduce the horizontal motion judder, but the horizontal motion estimation device 311 may find an incorrect motion vector when a vertical motion occurs, which can cause a motion compensation error and present defects on a frame.

In addition, the invention also uses a motion vector signal and a matching error signal obtained in estimation of a pixel point by the horizontal motion estimation device to decide whether the pixel point presents a vertical motion and to further count all points on a whole frame that present the vertical motion to thereby produce a weight for adjusting a weight of the result F2M produced by the horizontal motion estimation and compensation devices 311, 315 and a weight of the result F1P directly combined by the inverse pull down device 320.

As cited, the invention can overcome the fine horizontal lines due to the odd and even field differences after the compensation and also reduce the motion judder in the prior art.

Although the present invention has been explained in relation to its preferred embodiment, it is to be understood that many other possible modifications and variations can be made without departing from the spirit and scope of the invention as hereinafter claimed.

What is claimed is:
1. A de-interlacing system, comprising:
a first field buffer having an input terminal to receive fields successively entered and temporarily store an entered field as a next field, while a field to be entered into the first field buffer is a next-two field;

a second field buffer connected to the first field buffer for receiving the next field in the first field buffer and temporarily storing the next field as a current field;

a line buffer connected to the input terminal, the first field buffer and the second field buffer for temporarily storing partial line data of the current field;

a motion adaptive de-interlacer (MADI) connected to the line buffer for producing a de-interlaced video frame according to the partial line data;

a film frame generator connected to the line buffer for producing a de-interlaced film frame signal according to the partial line data;

a film signal detector connected to the input terminal, the first field buffer and the second field buffer for deciding whether a stream corresponding to the next-two field is a video stream or a film stream based on the next-two field, the next field and the current field, and accordingly outputting a mode index; and a multiplexer connected to the MADI, the film frame generator and the film signal detector for selecting the de-interlaced video frame or film frame as an output based on the mode index.

2. The de-interlacing system as claimed in claim 1, wherein the film frame generator comprises:

a motion compensated de-interlacer (MEMC) connected to the line buffer for producing a weighting signal and a motion compensated de-interlacing frame based on the partial line data temporarily stored in the line buffer;

an inverse pull down device connected to the line buffer for producing an inverse pull down de-interlacing frame based on the partial line data; and a weighting device connected to the motion compensated de-interlacer and the inverse pull down device for performing a weighting operation on the motion compensated de-interlacing frame and the inverse pull down de-interlacing frame to produce the de-interlaced film frame.

3. The de-interlacing system as claimed in claim 2, wherein the motion compensated de-interlacer comprises:

a horizontal motion estimation device connected to the line buffer for producing a motion vector signal and a matching error signal based on the partial line data;

a horizontal motion compensation device connected to the line buffer for producing the motion compensated de-interlacing frame according to the partial line data and the motion vector signal; and a vertical motion detection device connected to the horizontal motion estimation device for producing the weighting signal according to the motion vector signal and the matching error signal.

4. The de-interlacing system as claimed in claim 3, wherein a possibility of vertical motion is reduced when the weighting signal is increased.

5. The de-interlacing system as claimed in claim 4, wherein the de-interlaced film frame is expressed as:

$$\text{weight} \times F2M + (1-\text{weight}) \times F1P,$$

where "weight" indicates the weighting signal, F2M indicates the motion compensated de-interlacing frame, and F1P indicates the inverse pull down de-interlacing frame.

6. The de-interlacing system as claimed in claim 5, wherein the vertical motion detection device comprises:

a subtractor for receiving the motion vector signal of each pixel to produce a motion vector difference signal for each pixel;

an absolute value device connected to the subtractor for performing an absolute operation on the motion vector difference signal to produce a motion vector absolute difference signal;

a first comparator connected to the absolute value device for producing a first comparison signal when the motion vector absolute difference signal is smaller than a first threshold;

a second comparator connected to the horizontal motion estimation device for producing a second comparison signal when the matching error signal is greater than a second threshold;

an AND gate connected to the first comparator and the second comparator for performing an AND operation on the first comparison signal and the second comparison signal to produce an index signal for each pixel; and a counter connected to the AND gate for counting the index signal to produce a counting result and use the counting result to produce the weighting signal through a lookup table.

* * * * *